3,635,929
PROCESS FOR THE HALOGENATION OF VINYL POLYMERS
Giorgio Gatta, Mestre, and Roberto Rettore, Treviso, Italy, assignors to Montecatini Edison S.p.A., Milan, Italy
No Drawing. Continuation of application Ser. No. 566,231, July 19, 1966. This application Nov. 3, 1969, Ser. No. 871,558
Claims priority, application Italy, July 21, 1965, 7,188/65; Mar. 22, 1966, 15,807/66
Int. Cl. C08f 3/30, 27/02
U.S. Cl. 260—92.8                                       3 Claims

ABSTRACT OF THE DISCLOSURE

A process for making a polymeric material in which chemically combined vinyl-chloride polymer is chlorinated in a suspending medium containing a chlorofluoro-alkane in addition to a chloro-alkane from the class of chlorofluoro-methanes and ethanes and chloro-methanes and ethanes respectively. The volume ratio of the chlorofluoro-alkane to the chloro-alkane is less than about 10.

---

This is a continuation of Ser. No. 566,231, filed July 19, 1966, now abandoned.

The present invention relates to a process for the halogenation of vinyl chloride polymers and/or copolymers. More particularly this invention relates to the chlorination of vinyl chloride polymers and/or copolymers so as to obtain polymeric products with a high chlorination grade, endowed with properties suitable to be employed and worked as plastic materials in the normal apparatuses for the usual (not-chlorinated) vinyl chloride polymers and/or copolymers.

The chlorination product of polyvinyl chloride, which can be obtained by the process of the present invention, is characterized by a high thermal stability, by a molecular weight which is high enough even after the chlorination process and by a distribution of the particle sizes which is not too different from the one of polyvinyl chloride before the chlorination process.

It is known since long time that many properties of the vinyl chloride polymers, as for instance the highest working temperature or the maintainment of the mechanical properties at high temperatures, can be improved by chlorinating the polymer. As already known from a lot of works appearing in literature the chlorine percentage in polyvinyl chloride can be raised from 56.7% up to 73%; with this chlorine percentage the polymer has an average one chlorine atom for every carbon atom.

Many processes are also known for introducing chlorine in the polyvinyl chloride molecule; among the most well-known processes let us mention the passage of chlorine gas through a solution or dispersion of the polymer. Such a reaction can be accelerated by using photochemically activated light, particularly by using a light having a wave length comprised between 350 and 450 millimicrons, or by introducing the reaction medium substances able to give rise to free radicals, as for instance diacylperoxides and azo-compounds.

The efforts made by the various searchers for industrially employing the highly chlorinated polyvinyl chloride have brought up the possibility of producing chlorination products very different one from another.

Such difference is mainly bound to the type of process used for the chlorination.

Such materials are particularly used in three fields:

Lacquers, varnishes and glues, for which good solubility properties are requested in suitable and particularly cheap solvents as well as a good elasticity and flexibility together with the properties of forming films.

Synthetic fibres, for which the highly chlorinated polyvinyl chloride should be still soluble in particular solvents suited for the spinning process and should have average values in the mechanical and stretching characteristics together with a high thermal stability.

Rigid manufactured goods for which it is necessary that the highly chlorinated polyvinyl chloride has the following properties: a high thermal stability, high working degree, high mechanical characteristics and a high stability against corrosive agents.

The highly chlorinated polyvinyl chloride is a material that can provide remarkably improved products, in respect with those obtained from normal polyvinyl chloride, particularly for the car industry, for the chemical industry and for the building industry etc.

As already pointed out many processes are known for the chlorination of polyvinyl chloride. From a general point of view one may say that they can be grouped in two basic groups:

(a) Processes carried out in the absence of water, in which polyvinyl chloride is dissolved or suspended in solvents or in particular chlorinated organic products. The chlorination is carried out with the commonly known chlorinating agents and the reaction rate is accelerated by photochemically active radiations or by substances able to give rise to radicals. The quantity of polymer dissolved, in the case of the solution processes, is limited to a few parts percent whereas for the suspension processes, when the polymer is suspended in particular organic chlorinated liquids (for instance $CHCl_3$, $CCl_4$, dichloroethane etc.) there is always a limitation due to the remarkable swelling power of the solvent as regards the polyvinyl chloride.

In all these processes the recuperation of the post-chlorination product is particularly expensive and the volume of reactants in such processes are extremely high. The chlorination product finally, obtained both by solution and suspension processes, results to be very altered in its initial physical form of the particles, and for this reason its successive working for the transformation into plastic material is not easy. Such processes in fact have been industrially realized only in order to obtain products which can be worked as solutions, for obtaining lacquers, varnishes, glues and fibres.

(b) More recent processes show the possibility of chlorinating polyvinyl chloride powder suspended in an aqueous medium still utilizing the well known chlorinating agents. Particular swelling agents with different functions, among which the one of leading to chlorination products which are particularly stable to heat are added to the aqueous suspension. Such processes are always conditioned by the presence of the aqueous phase and particularly by the presence of an aqueous solution of hydrochloric acid which gives rise in this way to an extremely corrosive reaction medium, so that the realization of such processes on an industrial scale is very difficult and very expensive.

Object of the present invention is therefore a chlorination processes of vinyl chloride polymers and/or copolymers, this process being free from the above mentioned drawbacks and able to lead to highly chlorinated polymeric materials endowed with a good stability to heat, these polymeric materials having a molecular weight form and sizes of the particles practically unaltered in respect with the not-chlorinated polymer so that they can be profitably utilized as rigid plastic materials with the common working methods used for the normal polyvinyl chloride which are well known to those skilled in the art.

It has surprisingly been found, according to the present invention, that highly chlorinated vinyl chloride polymers and/or copolymers endowed with the above mentioned good properties can be obtained by suspension chlorination of vinyl chloride polymers and/or copolymers making use of a suspending medium constituted of at least one aliphatic chlorofluoroalkane utilizing the chlorination processes well known in the case of the organic substances.

The presence of aliphatic chlorofluoroalkanes in the reaction medium leads to vinyl chloride polymers which are perfectly stable to heat; at the same time the chlorinated polymeric material is shielded from demolitions due to action of attinic rays and the presence of chlorine radicals at high concentrations.

It has been found accordinng to the invention that the chlorination process can be carried out in the presence of a suspending medium consisting of:

(a) chlorofluoro alkanes (alone)
(b) chlorofluoro alkanes+water+strong acids
(c) chlorofluoro alkanes+chloro alkanes In the first case (item a) the process according to this invention permits to carry out high concentrations of polymer in the suspending medium without having harmful swelling of the polymer and avoiding in the meantime the formation of a highly corresive medium due to the aqueous hydrochloric acid.

In the second case (item b) the process according to this invention permits to obtain a post-chlorinated product able to maintain practically unaltered the sizes and the morphologic characteristics of the particles.

In the third case (item c) the process according to this invention permits to reach remarkable improvements both in respect of the use of chlorofluoro-alkane alone (item a) and to a major extent, in respect of the use of chloro alkanes-alone. In fact when the chloro-alkane alone is used, if the ratio between suspending medium and suspended polymeric material is such as to bring to a high solid (polymeric material) content, the polymeric material displays a total absorption in confront of the suspending medium giving thus rise to formation of a mass that can not be stirred and not be chlorinated in the usual apparatuses.

When expensive and complex apparatuses are used the chlorination becomes possible; at any rate in this case it is very difficult to obtain a polymeric material in form of powder.

When the chlorofluoro alkane alone or lower aliphatic hydrocarbon containing both chlorine and fluorine is used the chlorination is possible, however the chlorination rate is rather low and sometimes the quality of the post-chlorination material is not satisfying.

The process of this invention can be profitably used for the chlorination of vinyl chloride polymers as well as of copolymers of vinyl chloride with other monomers such as vinyl acetate, vinylidene chloride, acrylic and methacrylic esters, esters of fumaric acid and the like, and also polyblends and vinyl chloride graft polymers and copolymers.

In the case of polyvinyl chloride it is preferred to use, according to this invention, an omopolymer prepared by the usual aqueous suspension polymerization processes with a molecular weight, defined as viscosity in cyclohexanone, at 0.40% weight/volume and at 25° C., varying between 0.30 and 0.75 and preferably between 0.40 and 0.60, with particles sizes comprised between 150 and 50 microns. Quite suitable for the process of this invention are the ompolymers of vinylchloride with particles sizes distribution, determined according to the ASTM E 11–61 Standard characterized by the following values:

Percent on a sieve of 40 mesh=0
Percent on a sieve of 60 mesh=0
Percent on a sieve of 80 mesh=0
Percent on a sieve of 100 mesh=0
Percent on a sieve of 140 mesh=40
Percent on a sieve of 200 mesh=40
Percent through a sieve of 200 mesh=20

These polymers are also characterized by a percentage of chemically combined chlorine equal to about 56.4%, by a specific weight of about 1.4 gr./cc. by a second order transition temperature of 75–85° C., by a Vicat temperature (5 kg. in oil with a penetration of 1 mm.) of 85–90° C. and by an average porosity, determined both as volume and average diameter of pores respectively varying between 0.2 and 0.4 cc./gr. and 0.30 and 0.60 microns. In the process of this invention the chlorination is carried out according to the well known processes for the chlorination of the organic substances. It is preferred to use dry gaseous chlorine. The reaction can be activated, according to the known processes, both by physical and chemical means.

In fact it is possible to operate in the presence of photochemically active luminous radiations or the chlorination can be carried out in the presence of small amounts of substances able to give rise to radicals.

Other than the common radical catalysts such as azo-bis-isobutyronitrile, lauryl peroxide, benzoylperoxide and the like, it has been found, according to the present invention that peroxide compounds with a high decomposition constant (low halving time in the temperature ranges useful for the chlorination according to this invention) such as tertiary-butyl perpivalate, diisopropylperoxydicarbonate and the like, prove to be particularly suitable substances able to accelerate the chlorination rate in the process of this invention.

In the process of this invention the chlorination rate is rather high and it is regulated, the lighting intensity, the radical catalyst amount and the concentration of chlorination agent (chlorine) being the same, by the type and the amounts of the components of the suspension medium.

In the process according to this invention, the chlorofluoroalkanes to be used as components of the suspension medium can be selected from the wide class of compounds containing at least one fluorine atom, one chlorine atom, with or without hydrogen and are preferably derived from methane, ethane, propane and other lower aliphatic hydrocarbons.

Particularly profitable results will be obtained when using the following compounds

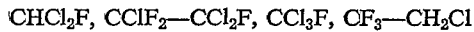

All these compounds can be used alone as well as in mutual mixtures.

In the process according to the present invention the chloroalkanes to be used as components of the suspension medium can be selected from a wide class of compounds.

Particularly suitable for this invention, proved to be chloroform carbontetrachloride, 1-2 dichloroethane and the like.

Among these compounds chloroform is the preferred.

When the suspension medium exclusively consists of chlorofluoroalkanes, alone or in mutual mixtures it is possible to operate, according to this invention, with suspension medium containing up to 35 parts by weight of polymeric material in respect to 100 parts by volume of suspension medium.

When the suspension medium consists of chlorofluoroalkanes and of an aqueous phase it is possible to operate, according to this invention, both with pure water and an aqueous solution of strong acids that do not undergo chemical alterations during the chlorination, such as for instance hydrochloric acid, trichloroacetic acid and the like.

The amounts of chlorofluoroalkanes in respect of the aqueous phase can be selected within a wide range.

Particularly good results can be obtained according to this invention, with volume ratios chlorofluoroalkanes/aqueous phase of about 0.25.

When the suspension medium consists of a mixture of chlorofluoroalkanes and chloroalkanes, the ratio by volume between these two components will vary within a wide range.

Particularly good results are obtained with ratio by volume chlorofluoroalkane/chloroalkane lower than 10 and preferably between 0.25 and 8.

Also in this case it possible according to this invention, to achieve high concentrations of polymeric material in the suspension medium; in fact it can be profitably worked with ratio (volume/weight) of suspension medium to polymeric material of 3/1.

In the process according to the present invention the chlorination temperature can be selected within a wide range.

When operating in nonpressurized apparatuses it is preferred to carry out the reaction at a temperature lower than the boiling temperatures of the chlorofluoroalkanes employed as components of the suspension medium. A preferred temperature range is between 5 and 60° C.

Higher reaction temperatures must be generally avoided. owing to the possible molecular breakings which lead to chlorinated polymers endowed with middling thermal stability.

When operating under pressure it is profitable to operate, according to this invention, by using chlorofluoroalkanes with a low boiling point.

A preferred temperature range is between 15 and 60° C. what above stated does not exclude that for particular purposes the reaction can be carried out at a temperature different from and more particularly higher than 60° C.

The vinyl chloride polymers and copolymers chlorinated according to this invention are uniformly characterized by good properties regarding the thermal stability that is higher than that one of the starting unchlorinated polymeric material.

The term "thermal stability" has been defined in accordance with the two methods of determination hereinafter described:

(a) According to the ASTM D-793-49 method, the quantity is determined of HCl developed at 180° C. in a nitrogen stream from 1 gr. of polymer for a heating time not lower than 60 minutes. Then the slope is determined of the curve expressing the quantity of HCl as function of the heating time. This slope, expressed in $h^{-1}$ and called "dehydrochlorination constant" (D.H.C.), is so much the lower the higher the stability of the polymer.

(b) The time is determined necessary for the appearance of a "mustard" color as well as the time necessary, for this colour to turn "amber" for a sample of a non-stabilized powdery polymer kept in special aluminum cups placed in an oven with air circulation at a temperature of 190° C.

When, following the chlorination process according to this invention, chlorine is introduced into the molecule of the polymer and copolymer of vinyl chloride, many of the characteristics of the starting polymer material are modified.

It has been in fact found that the specific weight, the temperature of glass transition Tg the self-extinguishing power and the Vicat penetration temperature grow with the increase of the quantities of chlorine introduced into the molecule.

A vinyl chloride polymer containing 68.6% by weight of chemically combined chlorine is characterized by:

A specific weight of 1.580 gr./cm.$^3$.
A glass transition temperature of about 141° C.

The D.H.C. thermal stability as above defined, equal to $1.620 \cdot 10^{-3}$ for a non-chlorinated vinyl chloride polymer, becomes $0.440 \cdot 10^{-3}$ for a vinyl chloride polymer containing 64.8% by weight of chlorine and it passes finally to $0.150 \cdot 10^{-3}$ for a vinyl chloride polymer having a content in chlorine of 68% by weight. It has however, surprisingly been found that in the chlorination process according to this invention the specific viscosities, measured as previously described, do not suffer substantial variations as on the contrary do the greatest part of the known processes. In the chlorinated polymeric materials according to this invention the mechanical characteristics remain still significant at higher temperatures than would be in the case of the rigid polyvinyl chloride.

Thus, for instance, a polymer with a 65% of combined chlorine, at 100° C. has still 28% and at 88° C., 60% of the original break resistance shown at 23° C.

In fact, as it is well known, at temperatures above 88° C., the rigid polyvinyl chloride shows a viscoelastic behaviour with a sudden drop of its break resistance as such temperatures are above its glass transition temperature.

The fact that the mechanical characteristics remain still good even at high temperature, allows to utilize these materials for uses that were not feasible so far with the normal polyvinyl chloride.

The polymeric materials chlorinated according to this invention may be processed with machines and equipment already known for the processing of the normal polymers of the non post-chlorinated vinyl chloride, keeping in mind, however, that to the percentage growth of combined chlorine must correspond an increase of the processing temperature.

Just for more indicatory purposes and for the case that a rigid vinylic sheet is intended to be produced on a roll-mill, the temperature range from 180° to 220° C. may be indicated as the most common interval suited for processing a post-chlorinated polyvinyl chloride with a chlorine percentage comprised between 56.7% and 70%.

The post-chlorinated polyvinyl chloride obtained by this invention may be plasticized in the same way as the other vinyl polymers, though the standard plasticizers are quite often less effective in the post-chlorinated polymer. In order to obtain compounds one may use conventional additives such as fillers, stabilizers, plasticizers, extenders, dyes pigments, lubricants and anti-sticking agents, which are commonly used with standard polyvinyl chloride.

According to a preferred form of embodiment of the process object of this invention, the following procedure is followed:

Firstly, the reaction vessel (details of which will be fully illustrated in Example 1) is freed from air by through flushings with dry nitrogen; thereupon the polymer powder is added together with the suspension medium. The temperature is brought up to the desired value and at the same time stirring is started. The mixture under stirring is maintained at the pre-established reaction temperature. Then the reaction mixture is saturated with gaseous chlorine and thereupon a lamp is lighted capable of emitting photochemically active light-radiations.

The flow rate of the chlorine gas must be adjusted in such a way as to ensure that there is always a slight excess of such a gas.

The excess of chlorine gas and of the hydrochloric acid developed in consequence of the chlorination reaction, is conveyed to an absorber containing an NaOH-solution.

In case there is an insufficient flow rate of chlorine, it will be necessary to switch off the radiating lamp until re-saturation of the reaction ambient has been attained again.

At the end of the chlorination reaction the radiating lamp is switched off and the supply of chlorine gas is cut off. By operating in this way it is possible to recover from the reaction mass, by distillation, the greatest part of the fluorochloro-alkane introduced into the dispersing medium.

A further advantage connected with this invention is related to the fact that the chlorofluoroalkanes containing hydrogen are further chlorinated and converted into products more valued than the starting products.

In the case the dispersing medium contains, besides the fluorochloroalkanes, also an aqueous phase, the suspension thus obtained at the end of the chlorination reaction, is filtered, the filtrate is then washed with water, and the chlorinated polymer thus obtained is then dispersed in an aqueous solution of 5% NaHCO₃ for the neutralization of the hydrochloric acidity.

The solution is then again filtered and repeatedly washed with water and then the chlorinated product is again dispersed in methanol in order to remove all traces of organic solvent. Thereupon the whole is finally filtered and dried for 24 hours at 50° C. under a reduced pressure.

A white powder is thus obtained having a particle size about equal to that of the starting polymer.

In case the chlorination is carried out by using chlorofluoroalkanes in admixture with chloroalkanes, after having removed by distillation the organic product, the chlorinated polymeric material is dispersed in an alkaline solution, one proceeding then as indicated above.

The following examples are given for merely illustrative purposes in order to more clearly define the inventive idea of this invention.

EXAMPLE 1

A sample of Sicron 548 FM, a commercial polyvinyl chloride of high porosity, produced, according to the suspension method, by Societé Edison Azienda Chimica Milano, and having the characteristics as recorded by the following table:

| | |
|---|---|
| Specific viscosity at 25° C | 0.467 |
| Porosity of the particles: | |
| (a) Medium volume of the pores cc./gr. | 0.27 |
| (b) Medium diameter of the pores microns | 0.48 |
| Particles sizes: | |
| Percent on a sieve official USA series to: | |
| 40 mesh | 0 |
| 60 mesh | 0 |
| 80 mesh | 0 |
| 100 mesh | 0 |
| 140 mesh | 41 |
| 200 mesh | 40 |
| Over 200 mesh | 19 |
| Specific weight 20/20 gr./cc. | 1.40-1.41 |
| Percent chlorine (Schoniger method) percent | 56.4 |
| HCL development in nitrogen stream at 180° C for 30' mgr. HCl/gr. polymer | 0.490 |
| Value of the constant of dehydrochlorination (D.H.C.) | $1.620.10^{-3}$ hours$^{-1}$ |
| Technological thermal stability at 190° C. "mustard" colour minutes | 20 |
| Technological thermal stability at 190° C. "amber" colour minutes | 90 |
| Temperature of glass transition of the second order—Tg ° C. | 72 | was chlorinated in the following way.

A mixture of 100 gr. of such a polymer, 210 ml. of aqueous HCl at 37° C., 180 ml. of water and 50 ml. of CHCl₂F were introduced in a glass flask of 1 l., holding capacity, after this latter had been thoroughly washed with nitrogen.

This glass flask was, furthermore, fitted with a blade stirrer and a condenser, fed with methanol, cooled at between −10° C. and −30° C. by a coolant mixture consisting of trichloroethylene and Dry-Ice, this flask being provided with a thermostatic jacket capable of maintaining inside the flask a temperature ranging from 3° to 5° C.

This reaction equipment was completed by a series of bubblers with a NaOH-solution, connected with the top of the condenser, these bubblers being necessary for collecting the HCl that develop following the reaction and because of the excess of chlorine. The reaction vessel was also put into contact with a 5 litre chlorine bottle fitted with a reducing valve and a flowmeter for the control of the gas flow, and finally, the reaction vessel was equipped with a mercury-vapour lamp of 125 watt, suitably screened and placed inside the flask.

On starting, the loading operation for the introduction of the reactants were carried out in the following order:

(1) Washing of the reaction apparatus with nitrogen;
(2) Introduction of the suspension of polyvinyl chloride in water and HCl, under a weak nitrogen flow;
(3) Starting of the stirrer and introduction of the fluorochloroalkane for a pre-established period of time;
(4) Contacting the polyvinylchloride with the chlorofluoroalkane for a prefixed time.

The polyvinyl chloride was left in contact with the mixture water/HCl chlorofluoroalkane (CHCl₂F) for about 30 minutes at an average temperature of the mixture of about 6° C.

After this the feeding of the chlorine flow was started at such a flowrate as to ensure always a slight excess of chlorine in the reaction medium. This excess could easily be ascertained by observing a certain bubbling in the alkaline-solution-absorbers placed down-stream of the condenser.

As soon as the reaction medium was saturated with chlorine, the mercury-vapour lamp was lighted and the chlorination was then carried out for about 4 hours, keeping the temperature of the reaction mass between 4° and 6° C. and regulating the flow rate of the chlorine in such a way as to ensure a stable excess of it.

Operating in this way it was found that the absorption of chlorine was not constant but greater during the first two hours. After four hours the ultraviolet lamp was switched off and the supply of chlorine interrupted; the polymer showed a white colour and resulted little swelled.

The fluorochloro-alkane, as CHCl₂F and CCl₃F, was removed by distillation from the reaction mass. The distilled phase contained 94.8% of CCl₃F and 5.2% of CCl₂HF.

The polymer suspension was then filtered and the filtrate then washed in a diluted aqueous solution (15%) of NaHCO₃, and subsequently washed with water and finally with an excess of methanol. The product thus obtained was finally dried in an oven at 50° C. at a reduced pressure for 24 hours. The end product appeared as a white powder totally similar in aspect to the starting polyvinyl chloride "Sicron 548 FM."

The dry polymer analyzed in order to establish its specific viscosity (index of molecular weight), the percentage of chlorine, the porosity of the particles, the particle size, the specific weight, the Vicat penetration temperature and the thermal stability determined both as the development of HCl at 180° C. in nitrogen as well as the variation of the colour of the powdery polymer dried in an oven at 190° C. resulted to be characterized by the properties reported on Table I.

Samples of such a polymer were easily processed in a roll-mill at 200° C. for a few minutes, in order to give well gellified rigid films, without their sticking onto the rollers of the mill. It was also possible to obtain rigid films of an ivory colour by introducing the conventional fillers and the known thermal stabilizers used for stabilizing the normal polyvinylchloride and which are suited for obtaining rigid manufactured articles.

EXAMPLE 2

A sample of commercial "Sicron 548 FM" of high porosity and having characteristics equal to those of the sample used in Example 1, was chlorinated under the same conditions already listed in the previous example, except for the fact that the fluorochloro-alkane was introduced in two portions: the first of 25 cc. together with all the other reactants and the second of 25 cc. after two hours of reaction.

It was noticed that the absorption of chlorine was the greatest during the 1st and 3rd hour of the reaction, that is, when there were present the fresh chlorofluoro-alkane.

The analysis of the chlorofluoro-alkane at the end of the reaction process yielded the following results:

By this example we mean to prove how it is possible according to this invention, to chlorinate the polyvinyl chloride and to obtain a product of high characteristics, in particular with an excellent thermal stability, also by carrying out the chlorination reaction in a dispersing medium consisting of an emulsion of water and of chlorofluoro-alkane, and by operating in the presence of a strong acid which is different from hydrochloric acid.

TABLE I

|  | Polymer as such | Example 1 | Example 2 | Example 3 | Example 4 |
|---|---|---|---|---|---|
| Reaction conditions: |  |  |  |  |  |
| Polymer, parts by weight |  | 100 | 100 | 100 | 100 |
| HCl at 37% (aqueous sol.) parts by volume |  | 210 | 210 |  |  |
| $H_2O$, parts by volume |  | 180 | 180 | 373 |  |
| $CHClF_2$, parts by volume |  | 50 | 50 | 47.5 | 50 |
| $CCl_3COOH$ at 20% (aqueous sol.), parts by volume |  |  |  |  | 371 |
| Duration of the stirring before reaction, in minutes |  | 30 | 30 | 30 | 60 |
| Duration of reaction, in hours |  | 4 | 4 | 4 | 4.5 |
| Reaction temperature, °C |  | 4–6 | 2–5 | 2–4 | 2–4 |
| Chlorine consumption, gr. chlorine/gr. polymer |  | 0.75 | 0.75 | 0.86 | 0.66 |
| Polymer type | (1) | (2) | (2) | (2) | (2) |
| Percent combined chlorine | 56.4 | 64.0 | 63.0 | 61.7 | 64.1 |
| Temperature of glass transition, $T_g$, °C | 72 | 106 |  |  | 110 |
| Specific viscosity | 0.467 | 0.456 | 0.456 | 0.450 | 0.464 |
| Porosity: |  |  |  |  |  |
| Pores volume, cc./gr. | 0.27 | 0.25 | 0.22 | 0.24 | 0.26 |
| Pores diameter, micron | 0.48 | 0.49 | 0.45 | 0.48 | 0.53 |
| Particles sizes, percent on mesh: |  |  |  |  |  |
| 40 | 0 | 0 | 0 | 0 | 0 |
| 60 | 0 | 0 | 0 | 0 | 0 |
| 80 | 0 | 0 | 0 | 1 | 2 |
| 100 | 0 | 0 | 1 | 1 | 1 |
| 140 | 41 | 51 | 52 | 57 | 56 |
| 200 | 40 | 34 | 33 | 33 | 40 |
| Over 200 | 19 | 15 | 14 | 8 | 12 |
| Specific weight, gr./cc. | 1.40 | 1.53 | 1.50 | 1.47 | 1.52 |
| VICAT temperature, °C | 84 | 110 | 101 | 105 | 117 |
| Thermal stability (HCl development at 180°) | 0.490 | 0.340 | 0.425 | 0.345 | 0.240 |
| Thermal stability (K in hours $^{-1}\times 10^{-3}$) | 1.620 | 1.690 | 0.370 | 0.750 | 0.350 |
| Technological stability, "mustard colour" (in min.) | 20 | 40 | 30 | 30 | 40 |
| Technological stability, "amber colour" (in min.) | 90 | 100 | 90 | 100 | 140 |

[1] Polyvinyl chloride.
[2] Chlorinated polyvinyl chloride.

$CHCl_2F = 35\%$ by volume
$CCl_3F = 65\%$ by volume

The polymer was then treated as in Example 1 and the results are recorded on Table I.

EXAMPLE 3

100 parts of polyvinylchloride of the same type of the Example 1, 373 parts of deionized water and 47.5 parts of $CHCl_2F$ were charged into an apparatus similar to that one described in Example 1. The thus obtained suspension was stirred for 30 minutes while the whole was maintained at about 6° C.; thereupon chlorine gas was introduced into the suspension and an ultraviolet radiation lamp lighted. The chlorination was carried out for 4 hours at a temperature of 3° C. About 0.86 gr. of chlorine per gram of polyvinyl chloride were used. The results obtained are recorded on Table I.

By this example we mean to prove how it is possible, according to this invention, to chlorinate the polyvinyl chloride by keeping it in suspension in a suspending medium formed by an emulsion of water and cholorfluoro-alkane.

EXAMPLE 4

100 parts by weight of polyvinyl chloride, of characteristics identical to those of the preceding examples, 50 parts by volume of $CHCl_2F$ and 371 parts by volume of an aqueous solution of trichloroacetic acid at 20% by weight were loaded into an apparatus similar to that one described in Example 1. This mass was kept under stirring for an hour at about 4° C., after which the feeding chlorine was started and the ultraviolet radiation lamp was lighted.

Under these conditions the chlorination was carried out for about 4 hours and 30 minutes with a consumption of chlorine of 0.66 gr. per gram of polymer.

A product was thereby obtained, the characteristics of which are summarized in Table I.

EXAMPLES 5–9

In the following examples, polyvinyl chloride showing the same characteristics as those described in Example 1 was chlorinated with gaseous chlorine.

The chlorination reaction was carried out maintaining the polymer in suspension in the following suspension media:

Example 5—$CHCl_2F$
Example 6—$CHCl_2F$ in admixture with $CCl_2F\text{-}CF_2Cl$
Example 7—$CCl_3F$
Example 8—$CF_3\text{-}CH_2Cl$
Example 9—$CCl_2F\text{-}CF_2Cl$ The reaction temperatures varied according to the type of chlorofluoroalkane used, that is. actually between 9° and 40° C. The consumption of chlorine varied from 0.96 to 3.4 gr. of chlorine per gram of polymer to be chlorinated.

The reaction time for all the tests was 4 hours. All the reaction conditions and the characteristics of the products obtained are recorded in the following Table II.

EXAMPLE 10

By operating in an apparatus similar to that described in Example 1, a vinyl chloride polymer was chlorinated. The characteristics of thus latter as well as the reaction conditions and the characteristics of the obtained chlorinated product are recorded in Table III.

EXAMPLE 11

By operating in an apparatus similar to that described in Example 1, a vinyl chloride polymer was chlorinated. The characteristics as well as the reaction conditions and the characteristics of the product directly obtained by the chlorination reaction, are recorded in Table IV.

TABLE II

| | Polymer as such | Example 5 | Example 6 | Example 7 | Example 8 | Example 9 |
|---|---|---|---|---|---|---|
| Reaction conditions: | | | | | | |
| Polymer parts by weight | | 100 | 100 | 100 | 100 | 100 |
| Chlorofluoro alkane type | | (1) | (2) | (3) | (4) | (5) |
| Parts by volume, of the first | | 300 | 67.2 | 300 | 300 | 30 |
| Parts by volume, of the second | | | 352 | | | |
| Duration of agitation before reaction in minutes | | 0 | 0 | 0 | 0 | 0 |
| Duration of reaction in hours | | 4 | 4 | 4 | 4 | 4 |
| Temperature of reaction, °C | | 9 | 9 | 23 | 6 | 40 |
| Chlorine consumption: gr. chlorine/gr. polymer | | 1.23 | 1.23 | 0.96 | 1.06 | 1.16 |
| Characteristics of the polymers: | | | | | | |
| Polymer type | (6) | (7) | (7) | (7) | (7) | (7) |
| Combined chlorine, percent | 56.4 | 62.0 | 61 | 61.5 | 60.3 | 63 |
| Temperature of glass transition, Tg, °C | 72 | 95 | | | | |
| Specific viscosity | 0.467 | 0.465 | 0.464 | 0.458 | 0.464 | 0.462 |
| Porosity: | | | | | | |
| Pores volume, cc./gr | 0.27 | 0.24 | 0.25 | 0.26 | 0.27 | 0.26 |
| Pores diameter, microns | 0.48 | 0.50 | 0.51 | 0.53 | 0.50 | 0.50 |
| Particles sizes percent on mesh: | | | | | | |
| 40 | 0 | 0 | 0 | 0 | 0 | 0 |
| 60 | 0 | 0 | 0 | 0 | 0 | 0 |
| 80 | 0 | 1 | 0 | 0 | 0 | 0 |
| 100 | 0 | 1 | 1 | 1 | 1 | 1 |
| 140 | 41 | 82 | 54 | 60 | 56 | 68 |
| 200 | 40 | 13 | 38 | 31 | 37 | 26 |
| Over 200 | 19 | 3 | 7 | 8 | 6 | 5 |
| Specific weight, gr./cc. | 1.4 | 1.49 | 1.47 | 1.48 | 1.46 | 1.50 |
| VICAT temperature, °C | 84 | 109 | 97 | 98 | 94 | 108 |
| Thermal stability (HCl development at 180° C) | 0.490 | 0.420 | 0.380 | 0.390 | 0.400 | 0.390 |
| Thermal stability (K in hours $^{-1}\times 10^{-3}$) | 1.620 | 1.200 | 0.920 | 1.080 | 1.220 | 0.950 |
| Technological stability "mustard colour" (in minutes) | 20 | 30 | 30 | 40 | 40 | 40 |
| Technological stability "amber colour" (in minutes) | 90 | 100 | 100 | 100 | 110 | 110 |

[1] $CHCl_2F$.
[2] $CHCl_2F$, $CClF_2-CCl_2F$.
[3] $CCl_3F$.
[4] $CF_3-CH_2Cl$.
[5] $CCl_2F-CF_2Cl$.
[6] Polyvinyl chloride.
[7] Chlorinated polyvinyl chloride.

TABLE III

| | | |
|---|---|---|
| Reaction conditions: | | |
| Polymer, parts by weight | 100 | |
| $CCl_2F-CClF_2$, parts by volume | 300 | |
| Duration of agitation before reaction in minutes | 15 | |
| Duration of reaction, in hours | 5 | |
| Reaction temperature, °C | 40 | |
| Chlorine consumption, gr. chlorine/gr. polymer | 1.47 | |

| | Polymer as such | Chlorinated polymer |
|---|---|---|
| Characteristics of the polymers: | | |
| Polymer type | PVC | PVC/Cl |
| Percent combined chlorine | 56.4 | 64.5 |
| Temperature of glass transition, Tg, °C | | |
| Specific viscosity | 0.638 | 0.630 |
| Porosity: | | |
| Pores volume, cc./gr | 0.31 | 0.27 |
| Pores diameter, micron | 0.52 | 0.58 |
| Particles sizes, percent on mesh: | | |
| 40 | 0 | 0 |
| 60 | 0 | 0 |
| 80 | 0 | 0 |
| 100 | 1 | 1 |
| 140 | 38 | 48 |
| 200 | 37 | 47 |
| Over 200 | 24 | 4 |
| Specific weight, gr./cc. | 1.40 | 1.52 |
| VICAT temperature, °C | 87 | 120 |
| Thermal stability (HCl development at 180° C.) | 0.460 | 0.290 |
| Thermal stability (K in hours$^{-1}\times 10^{-3}$) | 1.540 | 0.320 |
| Technological stability, "mustard colour" (in minutes) | 20 | 40 |
| Technological stability, "amber colour" (in minutes) | 90 | 130 |

TABLE IV

| | | |
|---|---|---|
| Reaction conditions: | | |
| Polymer, parts by weight | 100 | |
| $CCl_2F-CClF_2$, parts by volume | 300 | |
| Duration of agitation before reaction, in minutes | 20 | |
| Duration of reaction, in hours | 6 | |
| Reaction temperature, °C | 40 | |
| Chlorine consumption, gr. chlorine/gr. polymer | 1.39 | |

| | Polymer as such | Chlorinate polymer |
|---|---|---|
| Characteristics of the polymers: | | |
| Polymer type | PVC | PVC/Cl |
| Percent combined chlorine | 56.4 | 65.3 |
| Temperature of glass transition, Tg, °C | | |
| Specific viscosity | 0.395 | 0.380 |
| Porosity: | | |
| Pores volume, cc./gr | 0.09 | 0.04 |
| Pores diameter, micron | | |

TABLE IV.—Continued

| Particles sizes, percent on mesh: | | |
|---|---|---|
| 40 | 0 | 0 |
| 60 | 0 | 0 |
| 80 | 0 | 0 |
| 100 | 0 | 0 |
| 140 | 35 | 37 |
| 200 | 45 | 48 |
| Over 200 | 20 | 15 |
| Specific weight, gr./cc | 1.40 | 1.54 |
| VICAT temperature, °C | 82 | 129 |
| Thermal stability (K in hours$^{-1}$×10$^{-3}$) | 1.58 | 0.200 |
| Thermal stability (HCl development at 180° C.) | 0.47 | 0.310 |
| Technological stability, "mustard colour" (in minutes) | 30 | 40 |
| Technological stability, "amber colour" (in minutes) | 100 | 140 |

EXAMPLE 12–14

A polyvinylchloride of the same characteristics as those described in Example 1 was chlorinated with chlorine gas. The chlorination reaction was carried out maintaining the polymer suspended in suspension medium made up of a chlorofluoroalkane together with a chloroalkane and more particularly:

Example 12: $CHCl_2F + CHCl_3$
Example 13: $CHCl_2F + CHCl_3$
Example 14: $CCl_2F—CF_2Cl + CHCl_3$ The reaction temperatures varied, according to the type of chlorofluoroalkane from 9 to 40° C. The reaction temperature and the other reaction conditions together with the characteristics of the chlorinated polymers are recorded in the following Table V.

EXAMPLE 15

It was operated as in the preceding examples carrying out the chlorination of a mixture of 1100 cc. of $CCl_3F$ and 900 cc. of $CHCl_3$ containing as suspended material 600 gr. of a polyvinylchloride of the same properties of the product described in Example 1. The reaction conditions were the following: temperature, 28° C.; duration, 3 hrs.

The results thus obtained are listed on Table VI.

EXAMPLE 16

It was operated as in the preceding examples carrying out the clorination of a mixture 900 cc. of $CF_2Cl—CCl_2F$ and of 900 cc. of $CCl_4$ containing as suspended material 600 gr. of a polyvinylchloride of the same properties of the product described in Example 1.

The reaction conditions were the following: temperature, 36° C.; duration, 3 hrs.

TABLE V

| Reaction conditions: | Polymer as such | Example 12 | Example 13 | Example 14 |
|---|---|---|---|---|
| Polymers, parts by weight | | 100 | 100 | 100 |
| Chlorofluoro alkane type | | (1) | (1) | (2) |
| Chlorofluoro alkane, parts by volume | | 300 | 300 | 300 |
| Duration of agitation before reaction, in minutes | | 0 | 10–20 | 10–20 |
| Chloro alkane type | | (3) | (3) | (3) |
| Chloro alkane, parts by volume | | 47.5 | 47.5 | 47.5 |
| Duration of reaction, in hours | | 4 | 4 | 4 |
| Temperature of reaction, °C | | 9 | 9 | 40 |
| Chlorine consumption, gr. $Cl_2$/gr. polymer | | 3.40 | 1.00 | 1.50 |
| Characteristics of the polymers: | | | | |
| Polymer type | PVC | PVC/Cl | PVC/Cl | PVC/Cl |
| Combined chlorine, percent | 56.4 | 60.3 | 60.5 | 63.5 |
| Glass transition temperature, °C | 72 | | 90 | 104 |
| Specific viscosity | 0.467 | 0.464 | 0.463 | 0.459 |
| Porosity: | | | | |
| Pores volume, cc./gr | 0.27 | 0.21 | 0.14 | 0.18 |
| Pores diameter, micron | 0.48 | 0.52 | 0.68 | 0.61 |
| Particles sizes, percent on mesh: | | | | |
| 40 | 0 | 0 | 0 | 0 |
| 60 | 0 | 0 | 2 | 0 |
| 80 | 0 | 1 | 3 | 0 |
| 100 | 0 | 1 | 2 | 1 |
| 140 | 41 | 46 | 64 | 63 |
| 200 | 40 | 44 | 24 | 32 |
| Over 200 | 19 | 8 | 5 | 4 |
| Specific gravity, gr./cc | 1.4 | 1.46 | 1.46 | 1.52 |
| VICAT temperature, °C | 84 | 100 | 102 | 112 |
| Thermal stability (HCl development at 180° C.) | 0.490 | 0.435 | 0.475 | 0.290 |
| Thermal stability (K in hours $^{-1}$×10$^{-3}$) | 1.620 | 1.210 | 1.270 | 0.680 |
| Technological stability, "mustard colour," in minutes | 20 | 40 | 40 | 50 |
| Technological stability, "amber colour," in minutes | 90 | 110 | 90 | 110 |

[1] $CHCl_2F$.
[2] $CCl_2F—CClF_2$.
[3] $CHCl_3$.

The results thus obtained are listed on Table VI.

TABLE VI

|  | Example 15 | Example 16 |
|---|---|---|
| Specific viscosity at 25° C | 0.492 | 0.463 |
| Specific weight, 20°/20° gr./cc | 1.52 | 1.47 |
| Combined chlorine, percent | 64.6 | 61.0 |
| Chlorination grade, percent | 49.3 | 27.7 |
| Chlorination average hourly grade, percent | 16.4 | 8.2 |
| Chlorine consumation, gr. Cl$_2$/gr. PVC | 0.56 | 0.56 |
| Porosity: | | |
| Pores volumes, cc./gr | 0.25 | 0.25 |
| Pores diameter, microns | 0.62 | 0.60 |
| Particle sizes: | | |
| Percent on: | | |
| 40 mesh | 0 | 0 |
| 60 mesh | 0 | 0 |
| 80 mesh | 1 | 1 |
| 100 mesh | 3 | 3 |
| 140 mesh | 69 | 68 |
| 200 mesh | 22 | 24 |
| Over 200 mesh | 5 | 4 |
| VICAT penetration temperature, °C | 124 | 104 |
| Thermal stability: | | |
| HCl development at 180° C. after 30', mgr. HCl/mgr. PVC | 0.200 | 0.280 |
| K constant of D.H.C. in hrs.$^{-1}.10^{-3}$ | 0.360 | 1.000 |
| Thermal technological stability at 190° C.: | | |
| "Mustard colour," minutes | 45 | 35 |
| "Amber colour," minutes | 115 | 105 |

EXAMPLE 17

A sample of Sicron 830, a copolymer vinylchloride-vinyl acetate containing about 10% of chemically combined vinyl acetate, a commercial product prepared according to the suspension process by Società Edison Azienda Chimica Milano, furthermore characterized by the following properties:

Specific viscosity at 25° C.: 0.297
Specific weight 20°/20° gr./cc.
Chlorine combined Shöninger method) percent: 51.1
Particles sizes:
    percent on 40 mesh=0
    percent on 60 mesh=0
    percent on 80 mesh=3
    percent on 100 mesh=5
    percent on 140 mesh=45
    percent on 200 mesh=25
    percent over 200 mesh=22
Thermal stability:
    K constant of DHC in hrs.$^{-1}.10^{-3}$: 5.5
Thermal technological stability:
    at 180° C. (mustard colour) minutes: <10
    at 190° C. (amber colour) minutes: <20
Vicat penetration temperature ° C.: 71 was chlorinated in an apparatus similar to that one described in Example 1.

600 gr. of this copolymer and 2100 cc. of a mixture consisting of 1200 cc. of CF$_2$Cl—CCl$_2$F and of 900 cc. of CHCl$_3$ were charged into the chlorination apparatus.

The reaction conditions were the following: temperature, 36° C.; duration, 3 hrs.

The results thus obtained are the following:
Specific viscosity at 25° C.: 0.309
Specific weight 20°/20° gr./cc.
Chlorine combined percent: 61.3
Chlorination average hourly grade percent: 20.5
Chlorine consumption (gr. Cl$_2$/gr. polymer): 0.71
Porosity:
    pores volume: cc./gr.
    pores diameter: microns
Particles sizes:
    percent on 40 mesh: 0
    percent on 60 mesh: 0
    percent on 80 mesh: 4
    percent on 100 mesh: 4
    percent on 140 mesh: 44
    percent on 200 mesh: 30
    percent over 200: 18
Vicat penetration temperature ° C.: 121
Thermal stability:
K constant of D.H.C. (hrs.$^{-1}.10^{-3}$): 1.300
Thermal technological stability:
    mustard colour (minutes): 30
    amber colour (minutes): 70

EXAMPLE 18

A sample of a commercial polyvinyl chloride of high porosity and having the following characteristics:
Specific viscosity at 25° C.: 0.478
Specific weight 20/20° C. gr./cc.: 1.40–1.41
Percentage of chlorine (Shöninger method): 56.4%
Porosity of the particles:
    (a) average volume of the pores cc./gr.: 0.28
    (b) average diameter for the pores in microns: 0.56
Size of particles:
    percent on 40 mesh=0
    percent on 60 mesh=0
    percent on 80 mesh=1
    percent on 100 mesh=2
    percent on 140 mesh=64
    percent on 200 mesh=27
    percent over 200=6
(official USA series)
Thermal stability:
    Development of HCl in a nitrogen flow at 180° C. for 30 minutes; mgr. of HCl/gr. of polymer (PVC/Cl): 0.500
    Value of the K constant of dehydrochlorination (D.H.C.) $10^{-3}$ h$^{-1}$: 1.410
Technological thermal stability:
    at 180° C. mustard colour-minutes: 30
    at 190° C. amber colour-minutes: 100
Glass transition temperatures:
    of the 2nd order, Tg. ° C.: 79
Vicat penetration temperature ° C.: 89 was chlorinated in the following way:

A mixture of 1000 gr. of the polymer as above described and 3000 ml. of CCl$_2$F—CF$_2$Cl was introduced into a glass flask of 5 litres capacity, which has been thoroughly washed with nitrogen. Said flask was fitted with a blade stirrer rotating at 350 rev./min., with a condenser fed with methanol cooled at between −10° C. and −30° C. with a refrigerating mixture of trichloroethylene and Dry-Ice and fitted with a thermostatic sleeve capable of maintaining inside the flask a temperature between 10 and 40° C.

The reaction apparatus was completed by a series of bubblers containing an NaOH solution, connected with the condenser top which were necessary for collecting the HCl, that developed during the reaction, as well as the excess of chlorine.

The reaction vessel was also connected with a 5 litre chlorine bottle fitted with a reduction valve and a flow meter for the gas, while the reaction vessel was fitted with a high Hg pressure generator of 70 watt for ultraviolet rays, suitably screened and placed on the outside of the flask.

At the start the loading of the reactants took place in the following order:
(1) Washing of the apparatus with nitrogen,
(2) Introduction of the suspension of polyvinyl chloride in chlorofluoroalkane under a weak nitrogen current,
(3) Starting of the stirrer.

The feeding of the chlorine flow was started with such a flow rate as to have always inside the reaction medium a slight excess in chlorine.

This could be easily ascertained by seeing whether there was any bubbling in the alkaline solution absorbers placed downstream of the condenser.

As soon as the medium was saturated with chlorine vapors, the UV-rays generator was switched on, and chlorination was carried out for four hours, maintaining the reaction mass at about 35° C. and regulating the flow rate of the chlorine in such a way as to have always a slight excess of it. Operating in this way it was noted that the absorption of the chlorine was not constant but greater in the first two hours.

After four hours the UV-rays generator was switched off and the chlorine flow cut off. The polymer appeared to be white and in no way swelled.

The polymer suspension was filtered, the filtrate then washed with an aqueous solution of $NaHCO_3$ diluted at 5%, and subsequently washed with water and finally with an excess of methanol.

The product thus obtained was finally dried in an oven at 50° C. at a reduced pressure for 24 hours.

The end product appeared as a white powder, very similar to the starting polyvinyl chloride.

The dry polymer was then analyzed in order to determine and evaluate its properties.

The results of this analysis are recorded in Table VII.

EXAMPLE 19

600 gr. of polyvinylchloride with the same characteristics as those of Example 18, and 1800 cc. of a mixture constituted by 1260 cc. of $CF_2Cl$—$CCl_2F$ and 540 cc. of $CHCl_3$ were introduced into an apparatus similar to that described in Example 18.

The chlorination was then carried out under the same conditions as those described in Example 18 for a period of 5 hours at 31.5° C. Thereupon the separation and recovery of the chlorinated polymer was carried out as previously described and the results thus obtained are listed in Table VII.

EXAMPLE 20

The chlorination of a suspension, constituted by a mixture of 1080 cc. of $CF_2Cl$—$CCl_2F$ and of 720 cc. of $CHCl_3$ containing in suspension 600 gr. of polyvinyl chloride of the same characteristics as those of the polyvinyl chloride of Example 18, was carried out in the same way as that described in the preceding examples.

The reaction conditions were the following: temperature, 33° C.; duration, 5 hrs. The results obtained are listed in Table VII.

EXAMPLE 21

It was operated according to previous examples, carrying out the chlorination of a suspension containing:

$CF_2Cl$—$CCl_2$—900 cc.
$CHCl_3$—900 cc.
PVC—600 gr.

The polyvinyl chloride had the same properties of that one described in Example 18.

The reaction conditions were the following: duration 100 minutes; temperature 36° C.

The results thus obtained are listed on Table VII.

EXAMPLES 22–23

Example 21 was repeated but carrying out the reactions for two different times and more particularly for 3 hrs. and 20 minutes and for 5 hrs.

The results thus obtained are listed in Table VII.

EXAMPLE 24

Example 21 was repeated, but carrying out the reaction at 18° C. The results thus obtained are listed in Table VII.

EXAMPLE 25

Example 18 was repeated, with the difference, however that the reaction was activated with a radical catalyst instead of with UV radiations.

In this connection a solution of 18 gr. of diisopropylperoxydicarbonate in $CHCl_3$ was used and added at the start of the reaction to the suspension of the polymeric material.

The suspension medium consisted of 900 cc. of $$CF_2Cl\text{—}CCl_2F$$

and of 900 cc. of $CHCl_3$, and contained as suspended material 600 gr. of polyvinyl chloride having the same characteristics as that of Example 18.

The reaction conditions were the following: duration, 5 hrs.; temperature, 36° C. The results thus obtained are listed in Table VII.

TABLE VII

| Example | 18 | 19 | 20 | 21 | 22 | 23 | 24 | 25 |
|---|---|---|---|---|---|---|---|---|
| Specific viscosity at 25° C | 0.424 | 0.442 | 0.448 | 0.487 | 0.478 | 0.458 | 0.475 | 0.479 |
| Specific weight, gr./cc | 1.50 | 1.52 | 1.56 | 1.51 | 1.56 | 1.58 | 1.45 | 1.56 |
| Combined chlorine, percent | 63.0 | 64.8 | 67.1 | 63.7 | 67.1 | 68.6 | 59.7 | 67.0 |
| Chlorination grade, percent | 39.7 | 50.6 | 64.4 | 44.0 | 64.4 | 73.5 | 19.9 | 63.8 |
| Average hourly chlorination grade, percent | 10.0 | 10.1 | 12.9 | 26.5 | 19.4 | 14.7 | 12.0 | 12.8 |
| Consumption of chlorine, gr. chlorine/gr. polymer | 0.49 | 1.19 | 1.30 | | | 1.25 | 0.40 | 1.03 |
| Porosity: | | | | | | | | |
| Pores volume, cc./gr | 0.26 | 0.24 | 0.25 | | | 0.25 | 0.25 | 0.19 |
| Pores diameter, microns | 0.54 | 0.60 | 0.55 | | | 0.57 | 0.58 | 0.62 |
| Particles sizes: | | | | | | | | |
| Percent on: | | | | | | | | |
| 40 mesh | 0 | 0 | 0 | | | 0 | 0 | 0 |
| 60 mesh | 0 | 0 | 0 | | | 0 | 0 | 0 |
| 80 mesh | Traces | 1 | 3 | | | 2 | 1 | 1 |
| 100 mesh | 0.5 | 3 | 5 | | | 4 | 2 | 2 |
| 40 mesh | 68 | 66 | 79 | | | 69 | 64 | 64 |
| 200 mesh | 25.5 | 26 | 11 | | | 20 | 27 | 26 |
| Over 200 mesh | 6 | 4 | 2 | | | 5 | 6 | 7 |
| Vicat penetration temperature, ° C | 110 | 118 | 141 | | | 153 | 101 | 138 |
| Glass transition temperature, ° C | | | 130 | | | 141 | | 131 |
| Thermal stability: | | | | | | | | |
| Development of HCl at 180° C. after 30′ mgr. HCl/gr. polymer | 0.730 | 0.29 | 0.190 | 0.140 | 0.140 | 0.170 | 0.290 | 0.475 |
| Dehydrochlorination constant (DHC) $h^{-1}$ $10^{-3}$ | 1.430 | 0.440 | 0.190 | 0.465 | 0.170 | 0.150 | 1.260 | 0.410 |
| Technological thermal stability at 190° C.: | | | | | | | | |
| Mustard colour, minutes | 20 | 50 | 100 | | | >140 | | >120 |
| Amber colour, minutes | 80 | 140 | >140 | | | | | |

We claim:

1. A process for making a polymeric material characterized by good thermal stability and excellent self-extinguishing properties with respect to flame as well as improved physical properties even at elevated temperatures and processability in conventional equipment, said process comprising the step of chlorinating a polymeric base containing chemically combined vinyl chloride in suspension in a suspending medium consisting essentially of at least one chlorofluoroalkane selected from the group consisting of chlorofluoromethanes and chlorofluoroethanes in admixture with at least one chloroalkane selected from the group which consists of chloromethanes and chloroethanes, with a volume ratio of the chlorofluoroalkane to chloroalkane less than 10.

2. The process defined in claim 1 wherein said ratio ranges between 0.25 and 8.

3. The process defined in claim 2 wherein said chloroalkane is selected from the group consisting of chloroform, carbontetrachloride and dichloroethane.

References Cited

UNITED STATES PATENTS

| 2,996,489 | 8/1961 | Dannis et al. | 260—92.8 A |
|---|---|---|---|
| 3,334,077 | 8/1967 | Gateff | 260—92.8 A |

FOREIGN PATENTS

| 1,343,037 | 10/1963 | France | 260—92.8 A |
|---|---|---|---|
| 976,001 | 11/1964 | Great Britain | 260—92.8 A |

JOSEPH L. SCHOFER, Primary Examiner

J. A. DONAHUE, Jr., Assistant Examiner

U.S. Cl. X.R.

260—86.3, 87.1, 87.5, 87.7